United States Patent
Kanno et al.

(10) Patent No.: US 8,781,396 B2
(45) Date of Patent: Jul. 15, 2014

(54) CONTACTLESS RECEIVER, RESONANT CIRCUIT, AND VARIABLE CAPACITANCE ELEMENT

(75) Inventors: Masayoshi Kanno, Kanagawa (JP); Kazutaka Habu, Tokyo (JP); Makoto Watanabe, Miyagi (JP); Toshiaki Yokota, Miyagi (JP)

(73) Assignee: Dexerials Corporation, Tokyo (JP)

( * ) Notice: Subject to any disclaimer, the term of this patent is extended or adjusted under 35 U.S.C. 154(b) by 675 days.

(21) Appl. No.: 12/545,938

(22) Filed: Aug. 24, 2009

(65) Prior Publication Data

US 2010/0056098 A1 Mar. 4, 2010

(30) Foreign Application Priority Data

Aug. 29, 2008 (JP) ................................. 2008-222812

(51) Int. Cl.
*H04B 7/00* (2006.01)
*H04B 1/18* (2006.01)
*H04B 1/26* (2006.01)

(52) U.S. Cl.
USPC .................. 455/41.2; 455/292; 455/197.2

(58) Field of Classification Search
USPC ........... 455/292, 424, 425, 456.5, 456.6, 561, 455/550.1, 575.1, 88, 121, 125, 197, 193.1, 455/41.1, 41.2, 197.2, 197.3, 289; 257/295; 361/281, 434; 343/745, 750; 235/492
See application file for complete search history.

(56) References Cited

U.S. PATENT DOCUMENTS

| | | | | |
|---|---|---|---|---|
| 3,569,795 A * | 3/1971 | Gikow | ........................... | 361/434 |
| 3,859,624 A * | 1/1975 | Kriofsky et al. | .............. | 340/941 |
| 3,996,495 A * | 12/1976 | Herman | ......................... | 315/244 |
| 2005/0207518 A1* | 9/2005 | Toncich et al. | ................ | 375/347 |
| 2006/0228064 A1* | 10/2006 | Hunt et al. | ........................ | 385/2 |
| 2007/0164122 A1* | 7/2007 | Ju | ................................. | 235/492 |
| 2008/0083969 A1* | 4/2008 | Osada | ............................ | 257/595 |
| 2008/0180872 A1* | 7/2008 | Mishima et al. | ............... | 361/139 |
| 2009/0160263 A1* | 6/2009 | Spears et al. | ................... | 307/109 |
| 2010/0028263 A1* | 2/2010 | Schiffer-Mannioui et al. | ............................... | 424/9.2 |
| 2010/0056098 A1* | 3/2010 | Kanno et al. | ............... | 455/343.1 |
| 2010/0315302 A1* | 12/2010 | Diaz et al. | ...................... | 343/742 |
| 2010/0321857 A1* | 12/2010 | Habu et al. | ..................... | 361/281 |
| 2011/0163827 A1* | 7/2011 | Kanno et al. | ................... | 333/185 |
| 2011/0277361 A1* | 11/2011 | Nichol et al. | ................... | 40/541 |
| 2011/0317507 A1* | 12/2011 | Nakazawa | ............... | 365/230.03 |

FOREIGN PATENT DOCUMENTS

| | | |
|---|---|---|
| JP | 07-335490 | 12/1995 |
| JP | 08-007059 | 1/1996 |
| JP | 2001-160122 | 6/2001 |
| JP | 2001-005938 | 12/2001 |
| JP | A 2005-64437 | 3/2005 |
| JP | 2006-303219 | 11/2006 |
| JP | 2007-287996 | 11/2007 |
| WO | WO2006132570 | 12/2006 |

OTHER PUBLICATIONS

Japanese Patent Office Action corresponding to Japanese Serial No. 2008-222812 dated Jun. 15, 2010.

* cited by examiner

*Primary Examiner* — Yuwen Pan
*Assistant Examiner* — Xin Jia
(74) *Attorney, Agent, or Firm* — Oliff PLC

(57) ABSTRACT

A contactless receiver is provided with a receiving section and a rectification section. The receiving section has a resonant circuit including a resonant capacitor having a variable capacitance element formed with a ferroelectric material, a capacitance of the variable capacitance element changing according to a received voltage at a predetermined frequency, and a resonance coil connected to the resonant capacitor. The rectification section converts an alternating current voltage output from the receiving section into a direct current voltage.

16 Claims, 14 Drawing Sheets

CONTACTLESS RECEIVER, RESONANT CIRCUIT, AND VARIABLE CAPACITANCE ELEMENT

BACKGROUND OF THE INVENTION

1. Field of the Invention

The present invention relates to contactless receivers, resonant circuits, and variable capacitance elements, more specifically, to a contactless receiver, a resonant circuit, and a variable capacitance element which are suitably applied to devices, such as a contactless IC card, which receive electric waves from a reader/writer.

2. Description of the Related Art

Variable capacitance elements which receive bias signals from outside to change their capacitances to control frequency, time, etc. have been used. Examples of such variable capacitance elements which have been introduced into the market include variable capacitance diodes (varicaps) and MEMS (Micro Electro Mechanical Systems).

FIGS. 11A and 11B show a circuit configuration and an example of characteristics of a variable capacitance element. FIG. 11A shows a circuit configuration surrounding a variable capacitance element 160, and FIG. 11B shows a dependence of the capacitance Cv of the variable capacitance element 160 on control voltages. The variable capacitance element 160 normally has two terminals, and has no dedicated terminal for receiving bias signals to control the capacitance. Therefore, the variable capacitance element 160 is configured to have 4 terminals on an actual circuit as shown in FIG. 11A. More specifically, one terminal of the variable capacitance element 160 (variable capacitor) is connected to one input output terminal for alternating current signals via a bias removal capacitor 161, and is also connected to an input terminal for control voltage signals via a current limiting resistor 162. In addition, the other terminal of the variable capacitance element 160 is connected to the other input output terminal for the alternating current signals, and is also connected to an output terminal for the control voltage signals.

In a circuit configuration of the variable capacitance element 160 as described above, signal currents (alternating current signals) flow through the bias removal capacitor 161 and the variable capacitor 160, and control currents (DC bias current) flow only through the variable capacitor 160 via the current limiting resistor 162. In this process, the capacitance Cv of the variable capacitor 160 is changed by changing the control voltages, resulting in a change of the signal currents as shown in FIG. 11B.

Technologies for using variable capacitance elements as described above as a protection circuit in contactless IC cards have been proposed (refer to, for example, Japanese Unexamined Patent Application Publication No. 2008-7059). In Japanese Unexamined Patent Application Publication No. 2008-7059, variable capacitance elements are used as a protection circuit to avoid destruction of a control circuit including semiconductor devices with a low voltage endurance caused by excessively strong received signals when the contactless IC cards are brought close to the reader/writer (hereinafter referred to as an R/W).

FIG. 12 is a block diagram of the contactless IC cards proposed in Japanese Unexamined Patent Application Publication No. 2008-7059. In Japanese Unexamined Patent Application Publication No. 2008-7059, a variable capacitance diode 103d is used as a variable capacitance element. In addition, a series circuit including a bias removal capacitor 103c and the variable capacitance diode 103d is connected in parallel to a resonant circuit including a coil 103a and a capacitor 103b.

In Japanese Unexamined Patent Application Publication No. 2008-7059, a direct current voltage Vout obtained by detecting the received signals at a detector circuit 113 is divided by resistors 114a and 114b. The divided direct current voltage (direct current voltage applied to the resistor 114b) is applied to the variable capacitance diode 103d via a coil 115 to remove its fluctuation in order to adjust the capacitance of the variable capacitance diode 103d. That is, the divided direct current voltage is used as a control voltage of the variable capacitance diode 103d.

According to Japanese Unexamined Patent Application Publication No. 2008-7059, when there are excessively strong received signals, the capacitance of the variable capacitance diode 103d becomes smaller with the control voltage, making a resonance frequency of a receiving antenna 103 higher. FIG. 13 shows characteristics of the resonance frequency. In the characteristics shown in FIG. 13, the horizontal axis indicates frequencies, and the vertical axis indicates responses of signals. When there are excessively strong received signals, the capacitance of the variable capacitance diode 103d becomes smaller (that is, the combined capacitance of the receiving antenna 103 becomes smaller), and the resonance frequency of the receiving antenna 103 shifts to the higher region by the frequency $\Delta f$ corresponding to the amount of the decrease in capacitance (as shown by the dashed line in FIG. 13). This results in a response of the received signals at a frequency $f_0$ lower than that before the capacitance decreased, allowing the control of the level of the received signals. The technology proposed in Japanese Unexamined Patent Application Publication No. 2008-7059 protects a control circuit 120 with a variable capacitance element as described above.

The inventors have also proposed elements using ferroelectric material as a variable capacitance element (for example, refer to Japanese Unexamined Patent Application Publication No. 2007-287996). In Japanese Unexamined Patent Application Publication No. 2007-287996, a variable capacitance element 200 with an electrode structure as shown in FIGS. 14A and 14B has been proposed for higher reliability and productivity. FIG. 14A is a perspective view showing the outline of the variable capacitance element 200, and FIG. 14B is a sectional view showing the configuration of the variable capacitance element 200. The variable capacitance element 200 according to Japanese Unexamined Patent Application Publication No. 2007-287996 is provided with a terminal at each of four surfaces of a cubic-shaped dielectric layer 204. Two terminals facing each other among the four terminals are signal terminals 203a and 203b connected to a signal power supply 203, and the other two terminals facing each other are control terminals 202a and 202b connected to a control power supply 202.

Inside the variable capacitance element 200, as shown in FIG. 14B, a plurality of control electrodes 202c to 202g and a plurality of signal electrodes 203c to 203f are laminated one over another within a ferroelectric layer 204. In the example of FIG. 14B, the control electrode 202g at the lowest layer, the control electrode 202e at the 5th layer from the bottom, and the control electrode 202c at the top layer are connected to the control terminal 202a at one side. The control electrode 202f at the 3rd layer from the bottom and the control electrode 202d at the 7th layer from the bottom are connected to the control terminal 202b at the other side. In addition, the signal electrode 203f at the 2nd layer from the bottom and the signal electrode 203d at the 6th layer from the bottom are connected to the signal terminal 203a at one side. Moreover, the signal electrode 203e at the 4th layer from the bottom and the signal electrode 203c at the 8th layer from the bottom are connected to the signal terminal 203b at the other side.

The variable capacitance element 200 disclosed in Japanese Unexamined Patent Application Publication No. 2007-287996 provides advantages of being able to individually apply voltages to the control terminal and the signal terminal, and of being able to increase the capacitance with low cost by laminating layers of signal electrodes and control electrodes inside. In addition, the variable capacitance element 200 having a structure as disclosed in Japanese Unexamined Patent Application Publication No. 2007-287996 is easy to manufacture and has a low cost. Moreover, the variable capacitance element 200 according to Japanese Unexamined Patent Application Publication No. 2007-287996 does not need a bias removal capacitor 161 shown in FIG. 11A.

SUMMARY OF THE INVENTION

Contactless receivers, such as the contactless IC card described above, are disadvantageously subjected to excessively high received voltages when the contactless receivers are brought too close to an R/W, and semiconductor integrated circuit devices (ICs) are thereby damaged. In Japanese Unexamined Patent Application Publication No. 2008-7059, a variable capacitance diode is used as a protection circuit to solve this problem. In some related art, a switching circuit, including semiconductor devices such as FETs (Field Effect Transistors) etc., is used as a protection circuit at the input of the IC to solve the above-mentioned problem.

However, when a variable capacitance element is used as a protection circuit as disclosed in Japanese Unexamined Patent Application Publication No. 2008-7059, a bias removal capacitor for blocking direct currents needs to be connected to the variable capacitance element to prevent control signals (direct current voltage) from affecting a resonant circuit. In addition, an additional circuit is required for generating control signals for the variable capacitance element.

Moreover, when an element such as a variable capacitance diode according to Japanese Unexamined Patent Application Publication No. 2008-7059 or an FET is used as a protection circuit as described above, since dielectric strength of the components formed with semiconductor is low, the protection circuit itself has a low voltage endurance.

Furthermore, the variable capacitance element 200 proposed in Japanese Unexamined Patent Application Publication No. 2007-287996 includes 4 terminals, resulting in a larger element size and higher cost. The variable capacitance element 200 according to Japanese Unexamined Patent Application Publication No. 2007-287996 needs a peripheral circuit for generating control signals in the same manner as the examples of the related art shown in FIGS. 11 and 12.

The present invention addresses the above-identified problems. It is desirable to provide contactless receivers, resonant circuits, and variable capacitance elements which have simpler structures and excellent resistance to received voltages.

Means for Solving Problems

According to an embodiment of the present invention, there is provided a contactless receiver including a receiving section and a rectification section, and each section has a structure and a function described as follows. The receiving section includes a resonant circuit including a resonant capacitor including a variable capacitance element formed with a ferroelectric material, the capacitance of the variable capacitance element changing according to a received voltage at a predetermined frequency and a resonance coil connected to the resonant capacitor. The rectification section converts alternating current voltages output from the receiving section into direct current voltages.

In addition, according to an embodiment of the present invention, there is provided a resonant circuit including a resonant capacitor including a variable capacitance element formed with a ferroelectric material, the capacitance of the variable capacitance element changing according to an input alternating current voltage and a resonance coil connected to the resonant capacitor.

Moreover, according to an embodiment of the present invention, there is provided a variable capacitance element including a ferroelectric layer formed with a ferroelectric material and two electrodes sandwiching the ferroelectric layer. The ferroelectric layer has characteristics in which the capacitance changes according to an input alternating current voltage and in which the capacitance becomes smaller when the alternating current voltage becomes higher within a predetermined voltage range within the range in which the alternating current voltage changes.

The terms "received voltage" and "alternating current voltage" used herein mean, for example, an effective value, a maximum value, or an average value per half cycle of an alternating current voltage at a predetermined frequency received by a variable capacitance element, and the voltage can be determined on the basis of the variable capacitance element when selecting the element.

In an embodiment of the present invention, a variable capacitance element whose capacitance changes in accordance with a received alternating current voltages is used as a variable capacitance element for a receiving section of a contactless receiver as mentioned above. Therefore, control signals for changing the capacitance of the variable capacitance element and a circuit for generating the control signals are not necessary. In the embodiment of the present invention, the variable capacitance element is formed with a ferroelectric material with a voltage endurance higher than materials such as semiconductors. Therefore, according to the embodiment of the present invention, a simpler structure and a higher resistance to received voltages are provided.

DESCRIPTION OF THE PREFERRED EMBODIMENTS

An example of a contactless receiver according to an embodiment of the present invention will be described with reference to the accompanying drawings. The embodiment of the present invention will be described in the following order. The present invention is, however, not limited to the following example.

1. Structure of a contactless receiver
2. Structure of a variable capacitor
3. Design summary of a variable capacitor
4. Specific example
5. Modified example

[1. Structure of Contactless Receiver]

Figure 1:
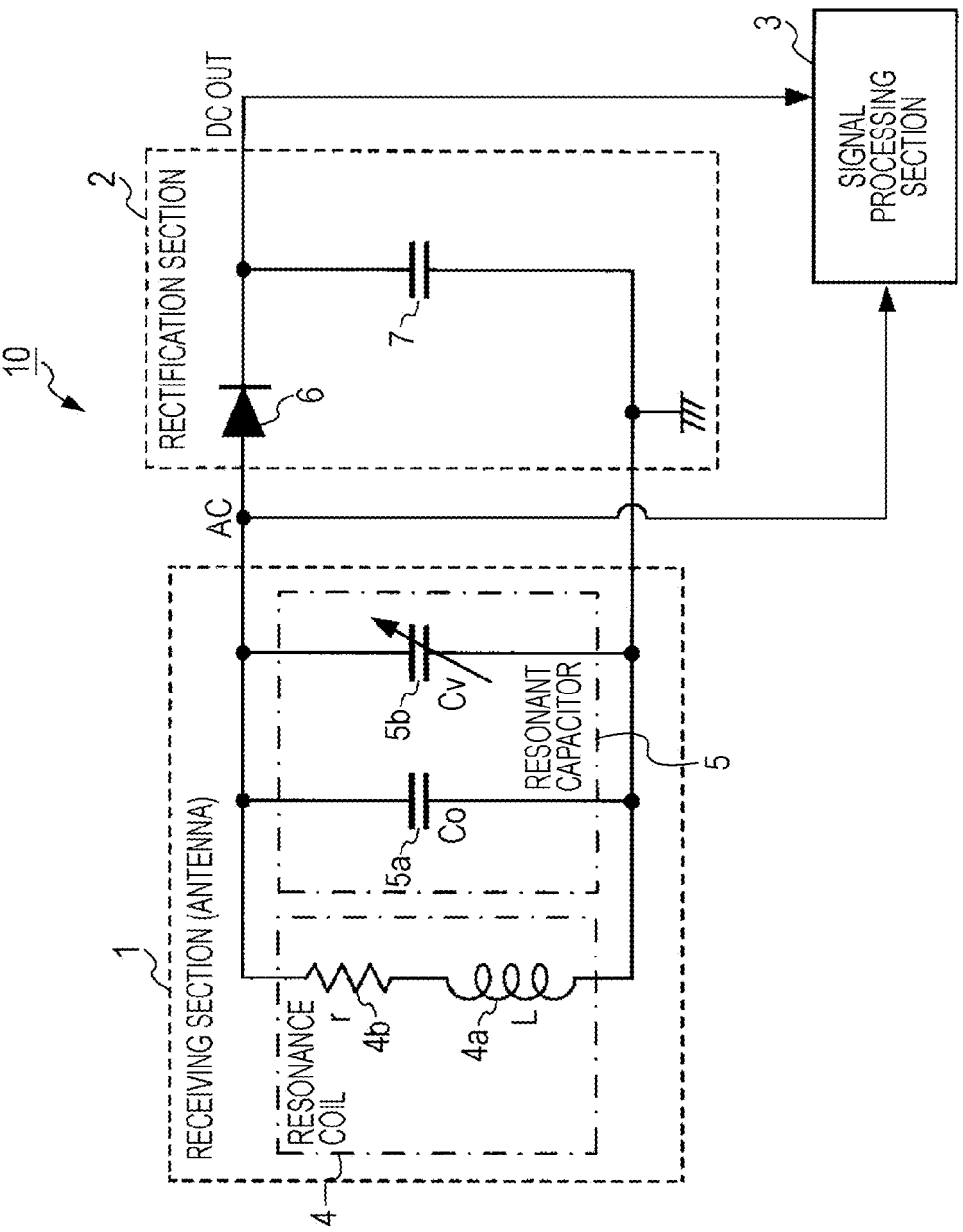
FIG. 1 is a block diagram of an example of a contactless receiver according to an embodiment of the present invention.

In this embodiment, a contactless IC card is used for an example of a contactless receiver. FIG. 1 is a block diagram of a receiving system (demodulation system) circuit section of the contactless IC card of this embodiment. In FIG. 1, a transmission system (modulation system) circuit section for signals is omitted for the sake of brevity. The structure of the transmission system circuit section is the same as that of contactless IC cards etc. of the related art.

A contactless IC card 10 includes, as shown in FIG. 1, a receiving section 1 (antenna), a rectification section 2, and a signal processing section 3.

The receiving section 1 includes a resonant circuit including a resonance coil 4 and a resonant capacitor 5, and signals transmitted from an R/W (not shown) for the contactless IC card 10 are received by the resonant circuit. In FIG. 1, the resonance coil 4 is constituted by an inductance component 4a (L) and a resistance component 4b (r: on the order of a few ohms).

The resonant capacitor 5 includes a capacitor 5a with the capacitance Co and a variable capacitor 5b (variable capacitance element) whose capacitance Cv changes according to the voltage of received signals (received voltage) connected in parallel. That is, in this embodiment, the variable capacitor 5b is connected in parallel with an antenna (a resonant circuit including the resonance coil 4 and the capacitor 5a) of the related art. The variable capacitor 5b will be described in detail later.

The capacitor 5a is a capacitor formed with a paraelectric material in the same manner as an antenna of the related art. The capacitor 5a formed with a paraelectric material has low relative permittivity and its capacitance negligibly changes regardless of the type of input voltages (alternating current or direct current) or its voltages. Therefore, the capacitor 5a is very stable for incoming signals. Antennas of the related art use capacitors formed with a stable paraelectric material for such incoming signals to prevent the resonance frequency of the antennas from shifting.

In an actual circuit, a fluctuation of the capacitance (on the order of a few pF) of the receiving section 1 is caused, for example, by a variation of the inductance component L of the resonance coil 4 or a parasitic capacitance of the input terminal of the integrated circuit in the signal processing section 3, and the amount of the fluctuation differs for each contactless IC card 10. Therefore, in this embodiment, electrode patterns of the capacitor 5a are trimmed to suitably adjust the capacitance Co in order to suppress (correct) influences caused by the fluctuation.

The rectification section 2 includes a half wave rectifier circuit including a rectification diode 6 and a rectification capacitor 7, and rectifies alternating current voltages received at the receiving section 1 to direct current voltages for output.

The signal processing section 3 mainly includes an integrated circuit (LSI: Large Scale Integration) of semiconductor devices, and demodulates the alternating current signals received at the receiving section 1. The LSI in the signal processing section 3 operates with the direct current voltage supplied from the rectification section 2. An LSI may be an LSI used for a contactless IC card of the related art (refer to FIG. 12, for example).

[2. Structure of a Variable Capacitor]

Figure 2:
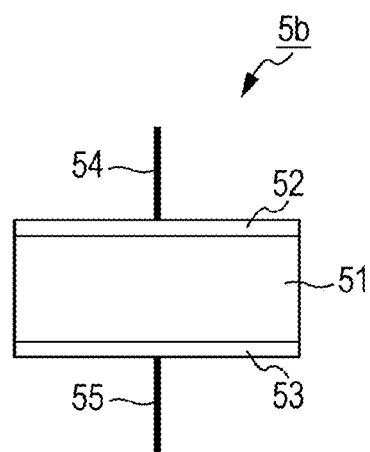
FIG. 2 is a block diagram showing the outline of a variable capacitor.
Figure 3:
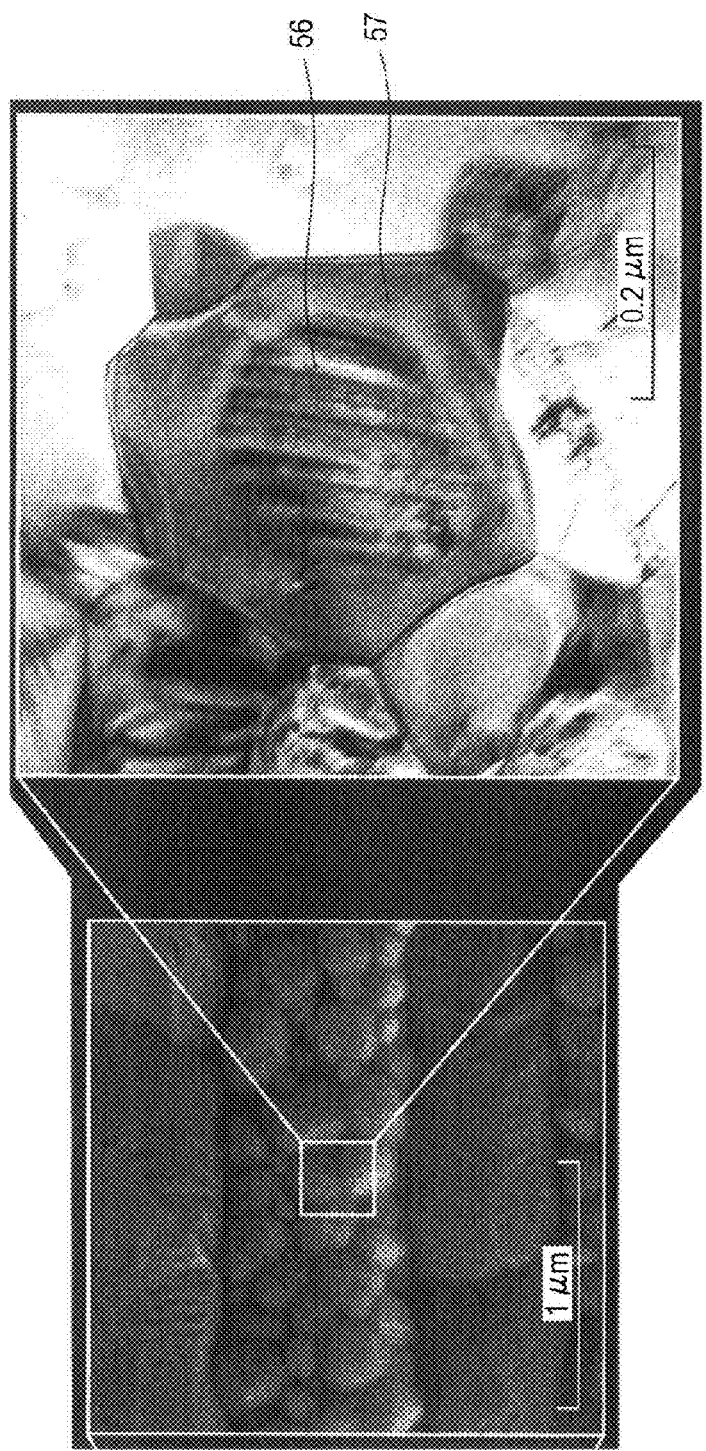
FIG. 3 is a cross section image of a ferroelectric layer.

Next, the variable capacitor 5b will be described with reference to FIGS. 2 to 4. FIG. 2 is a block diagram showing the outline of the variable capacitor 5b.

The variable capacitor 5b includes a ferroelectric layer 51 formed with a ferroelectric material and two electrodes 52 and 53 sandwiching the ferroelectric layer 51.

The electrodes 52 and 53 are connected to the rectification section 2 and the signal processing section 3 via leads 54 and 55, respectively. The electrodes 52 and 53 are formed with a metallic material, such as nickel. If the electrodes 52 and 53 are formed with nickel, the electrodes are formed using a nickel plating method etc.

The ferroelectric layer 51 is fabricated by firing a material including a ferroelectric material to which a rare earth metal etc. is added. In this process, forming conditions, film thickness, etc. of the ferroelectric layer 51 are suitably adjusted depending on dependence characteristics of the necessary capacitance on the alternating current voltage as will be described later.

A ferroelectric material used for the ferroelectric layer 51 may be, for example, a ferroelectric material in which ionic polarization occurs. A ferroelectric material in which ionic polarization occurs includes an ionic crystal material and is electrically polarized by atoms of positive ions and negative ions being displaced. A ferroelectric material in which ionic polarization occurs is generally expressed by a chemical formula of $ABO_3$ (O is an oxygen element), where two predetermined elements are A and B, and has a perovskite structure. Examples of such ferroelectric materials include barium titanate ($BaTiO_3$), potassium niobate ($KNbO_3$), and lead titanate ($PbTiO_3$). A ferroelectric material used for the ferroelectric layer 51 may be PZT (lead zirconate titanate) including lead titanate ($PbTiO_3$) mixed with lead zirconate ($PbZrO_3$).

When forming the ferroelectric layer 51, if a ferroelectric material such as that described above, to which a paraelectric material such as a rare earth metal is added, is fired, the ferroelectric layer 51 is formed as an aggregate of particles (particle diameter is equal to or smaller than approximately 1 μm) having a structure called a core shell structure. FIG. 3 shows the core shell structure of the particles (the particle diameter is approximately 0.3 μm in the example of FIG. 3) formed in the ferroelectric layer 51. FIG. 3 shows the particle structure where $BaTiO_3$ (barium titanate) is used as a ferroelectric material. The particles formed in the ferroelectric layer 51 include a core portion 56 made of a ferroelectric substance (appears as streaks in the right figure of FIG. 3) and a shell (husk) portion 57 having a paraelectric property formed so as to surround the core portion 56.

Figure 4:
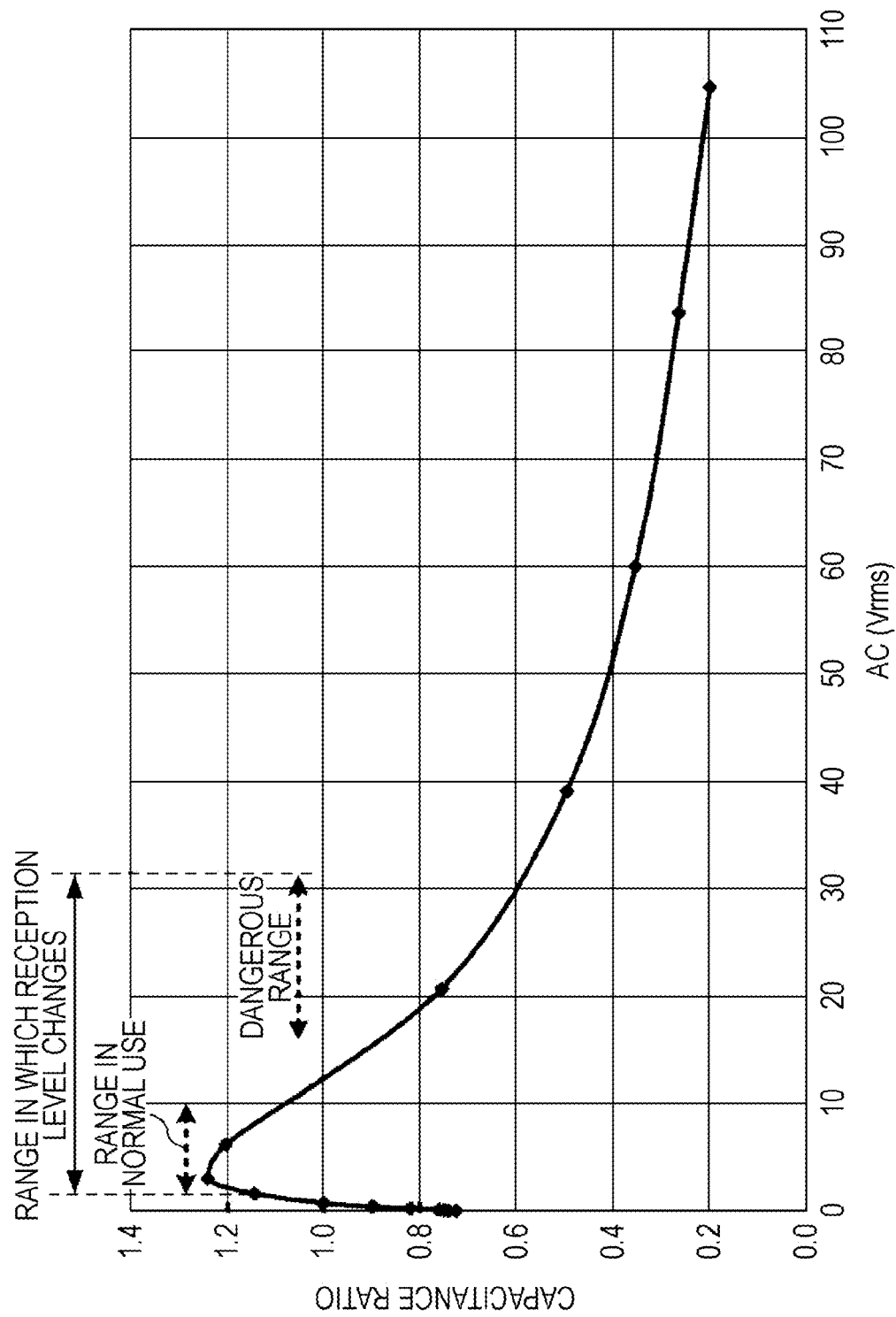
FIG. 4 shows an example of change of the capacitance of the variable capacitor with respect to an alternating current voltage.

FIG. 4 shows the dependence of the capacitance of the variable capacitor 5b including the ferroelectric layer 51 formed as an aggregate of the particles with the core shell structure on the alternating current voltage (this characteristic is hereinafter referred also to as a capacitance characteristic). The horizontal axis in FIG. 4 is an effective value Vrms of the alternating current voltage applied to both the ends of the resonance coil 4. The vertical axis is a capacitance ratio based on the capacitance of the variable capacitor 5b when the alternating current voltage at the frequency of 1 kHz and the voltage of 1 V is applied.

FIG. 4 also shows, for reference, an example of the range of the voltage (alternating current voltage) of received signals (alternating current signals) received by a contactless IC card. For example, as shown in FIG. 4, when a contactless IC card with a voltage range in normal use of approximately 1.4 to 10 V is brought close to the R/W, the voltage (effective value) of the alternating current voltage received by the contactless IC card may exceed 15 V and reach approximately 30 V at the maximum. In such a case, the LSI in the contactless IC card may be destroyed.

The capacitance Cv of the variable capacitor 5b, as shown in FIG. 4, becomes larger as the voltage becomes larger when the alternating current voltage applied is small. The capacitance of the variable capacitor 5b reaches the maximum at a certain voltage (peak voltage), and after that point, the capacitance decreases as the voltage increases. The area in which the capacitance decreases as the voltage becomes larger is called a capacitance lowering region.

The capacitance characteristic of the variable capacitor 5b shown in FIG. 4 can be adjusted by changing the thickness of the shell portion of the core shell structure. The thickness of the shell can be adjusted by changing a composition of a ferroelectric material, sintering conditions, types of additional elements, and the respective amounts of the elements. The capacitance characteristic of the variable capacitor 5b can also be adjusted by changing the thickness of the ferroelectric layer 51. For example, the alternating current voltage applied to the variable capacitor 5b can be decreased by making the thickness of the ferroelectric layer 51 smaller. As described above, the peak voltage where the capacitance of the variable capacitor 5b reaches the maximum and the rate of change (slope of the characteristic line) etc. of the capacitance in the capacitance lowering region can be suitably adjusted by adjusting the forming conditions and film thickness of the ferroelectric layer 51.

In this embodiment, a ferroelectric material in which ionic polarization occurs is used as a formation material of the ferroelectric layer 51 of the variable capacitor 5b as an example; however, the present invention is not limited thereto. Any materials may be used as long as the material is a ferroelectric material with a capacitance characteristic having an area where the capacitance decreases as the alternating current voltage becomes larger (capacitance lowering region) as shown in FIG. 4. The ferroelectric layer 51 may be composed of a ferroelectric material with anisotropy.

In addition, a formation material of the ferroelectric layer 51 may be a ferroelectric material in which electronic polarization occurs. In this ferroelectric material, an electric dipole moment is produced by separation of positive electric charges and negative electric charges, and polarization occurs. As such a material, rare earth iron oxides which become polarized and have characteristics of ferroelectric substances with the formation of a surface with electric charges of $Fe^{2+}$ and a surface with electric charges of $Fe^{3+}$ have been reported. In this system, it has been reported that, in the case that a rare earth element is RE and an iron family element is TM, the material expressed with the molecular formula $(RE).(TM)_2.O_4$ (O: oxygen element) has high permittivity. Examples of rare earth elements include Y, Er, Yb, and Lu (Y and heavy rare earth elements are usually used) and examples of iron family elements include Fe, Co, and Ni (Fe is usually used). Examples of $(RE).(TM)_2.O_4$ include $ErFe_2O_4$, $LuFe_2O_4$, and $YFe_2O_4$.

[3. Design Summary of A Variable Capacitor]

Figure 5A:
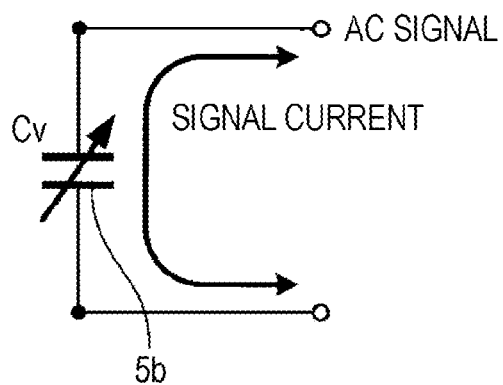
FIG. 5A is a schematic circuit diagram surrounding the variable capacitor.

Next, the design summary of the capacitance characteristic of the variable capacitor 5b according to the embodiment will be described with reference to FIGS. 5 and 6. FIG. 5A is a schematic circuit diagram of a circuit including the variable capacitor 5b, and FIG. 5B shows a dependence of the capacitance Cv of the variable capacitor 5b on the alternating current voltage (capacitance characteristic).

In this embodiment, at first, the forming conditions and film thickness of the ferroelectric layer 51 are adjusted so that the voltage of received signals corresponding to the maximum capacitance of the variable capacitor 5b (peak voltage) is on the order of the minimum operating voltage of the LSI of the signal processing section 3. In addition, the forming conditions and film thickness of the ferroelectric layer 51 are adjusted so that the slope of the capacitance lowering region of the capacitance characteristic of the variable capacitor 5b is large.

Figure 5B:
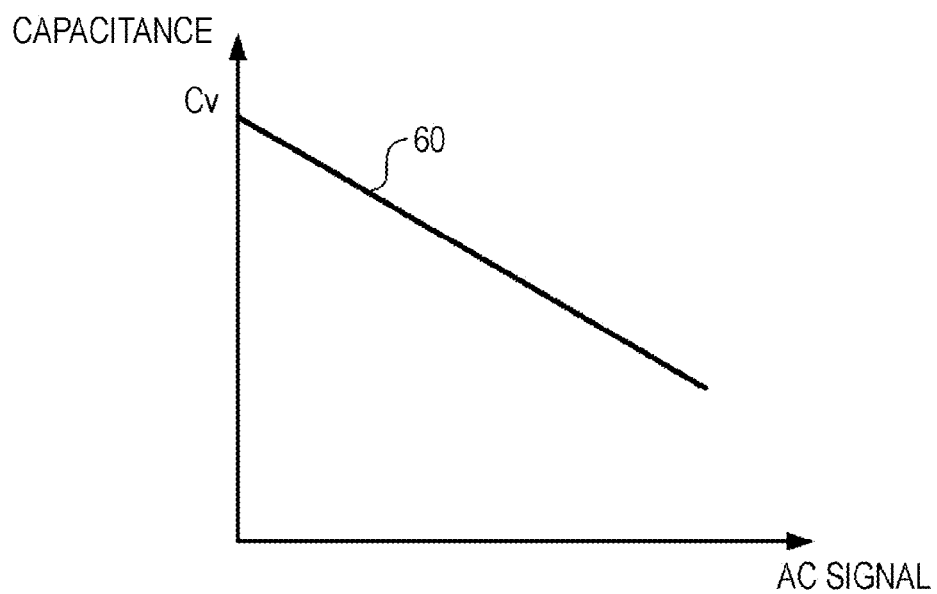
FIG. 5B shows a capacitance change of the variable capacitor with respect to the alternating current voltage.

By adjusting as described above, the capacitance characteristic is obtained in which the capacitance Cv of the variable capacitor 5b monotonically decreases with respect to the alternating current voltage of received signals in the range of the minimum operating voltage of the LSI to the maximum voltage of received signals (actual received voltage range) as shown with the characteristic line 60 of FIG. 5B.

The peak voltage corresponding to the maximum capacitance of the variable capacitor 5b may be smaller than the minimum operating voltage of the LSI of the signal processing section 3. As is clear from FIG. 4, when the peak voltage corresponding to the maximum capacitance of the variable capacitor 5b is equal to or smaller than the minimum operating voltage of the LSI of the signal processing section 3, the range from the minimum operating voltage of the LSI to the maximum voltage of received signals is the capacitance lowering region. Therefore, even when the peak voltage corresponding to the maximum capacitance of the variable capacitor 5b is smaller than the minimum operating voltage of the LSI of the signal processing section 3, a capacitance characteristic similar to the characteristic line 60 of FIG. 5B is obtained.

In addition, in this embodiment, the capacitance characteristic of the variable capacitor 5b is adjusted so that when signals having the maximum voltage Vmax are received, the reception level at the receiving section 1 at the frequency of received signals (output voltage) is equal to or smaller than VLmax. Design conditions for obtaining the reception level at the receiving section 1 equal to or smaller than VLmax when signals with the maximum voltage Vmax are received will be described in detail in a specific example later.

Figure 6A:
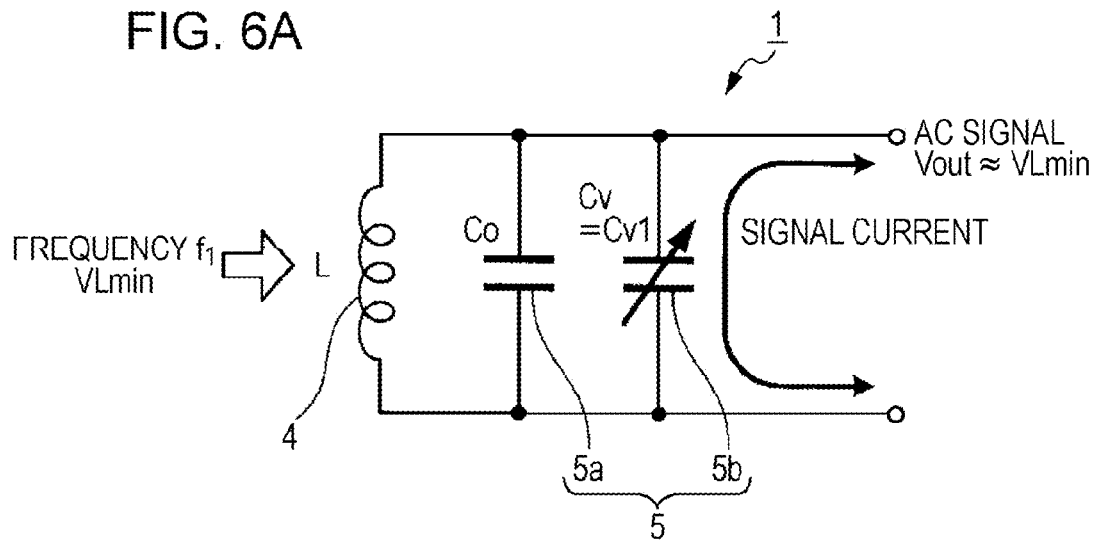
FIG. 6A shows an operation when signals with the minimum operating voltage of the LSI are received.
Figure 6B:
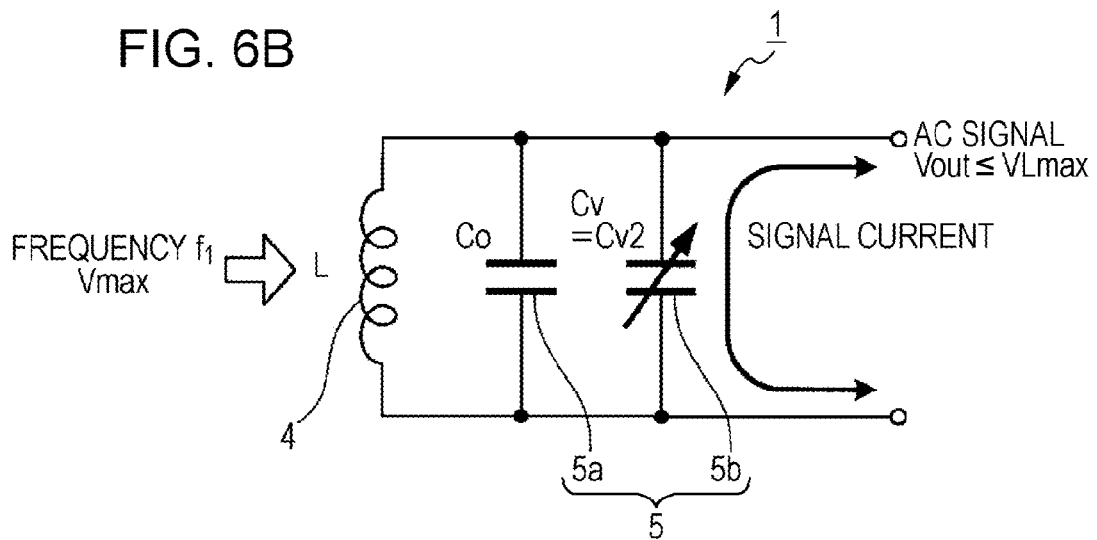
FIG. 6B shows an operation when signals with the maximum voltage are received.

FIG. 6 shows operations of the receiving section 1 having the variable capacitor 5b whose capacitance characteristic has been adjusted according to the above-mentioned design summary. FIG. 6A shows an operation of receiving received signals having almost the same voltage as the minimum operating voltage VLmin of the LSI at the frequency $f_1$. FIG. 6B shows an operation of receiving received signals having the maximum voltage Vmax (>the maximum operating voltage VLmax of the LSI) at the frequency $f_1$.

As described above, in this embodiment, the capacitance characteristic of the variable capacitor 5a is adjusted so that the peak voltage corresponding to the maximum capacitance of the variable capacitor 5b is almost the same as the minimum operating voltage of the LSI of the signal processing section 3. Therefore, when received signals having the minimum operating voltage level VLmin of the LSI are received at the frequency $f_1$, the resonance frequency of the resonant circuit including the resonant capacitor 5 and the resonance coil 4 is almost the same as the frequency $f_1$ of the received signals. As a result, in this case, the alternating current signal Vout having the same voltage as the received signals is output from the receiving section 1 as shown in FIG. 6A. When the peak voltage corresponding to the maximum capacitance of the variable capacitor 5b is adjusted to be smaller than the minimum operating voltage of the LSI of the signal processing section 3, the voltage of the alternating current signal output from the receiving section 1 is smaller than the minimum operating voltage of the LSI.

On the other hand, the capacitance characteristic of the ferroelectric layer 51 is adjusted so that the alternating current signals smaller than the maximum operating voltage VLmax of the LSI are output from the receiving section 1 when the received signals having the maximum voltage Vmax (>the maximum operating voltage VLmax of the LSI) are received at the frequency $f_1$ as described above. Therefore, in this case, the alternating current signal Vout having a voltage equal to or smaller than the maximum operating voltage VLmax of the LSI is output from the receiving section 1 as shown in FIG. 6B.

In this embodiment, the capacitance characteristic of the variable capacitor 5b is adjusted so that the voltage of output signals at the receiving section 1 (the reception level at the receiving section 1 at the frequency of the received signals) falls within the tolerance of operation of the LSI of the signal processing section 3 as described above. Therefore, the LSI of the signal processing section 3 will not be destroyed even when the contactless IC card 10 is brought too close to the R/W and receives signals with excessive voltage.

In addition, in this embodiment, the variable capacitor 5b whose capacitance changes according to the voltage of received signals is used as a protection circuit of the contactless IC card 10. Therefore, the capacitance does not have to be changed using a control voltage (direct current voltage) unlike the example of the related art in FIGS. 11A and 12, resulting in a simpler circuit configuration. Moreover, since a bias removal capacitor or an additional circuit for generating control voltages does not have to be provided, contactless IC cards can be fabricated at a lower cost. In addition, space can be saved (smaller device can be provided).

Figure 11A:
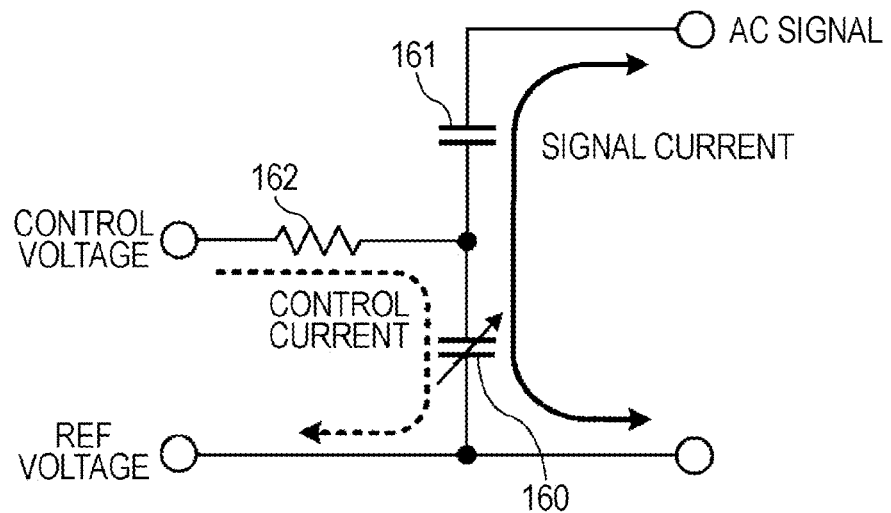
FIG. 11A is a schematic circuit diagram of a circuit surrounding a variable capacitor of the related art.
Figure 11B:
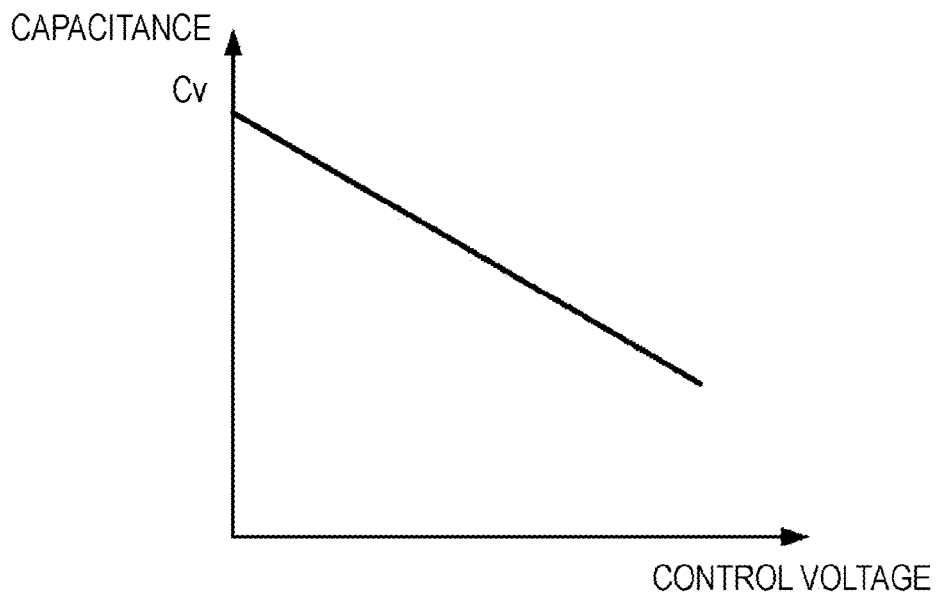
FIG. 11B shows a capacitance change of a variable capacitor of the related art with respect to control voltages.
Figure 12:
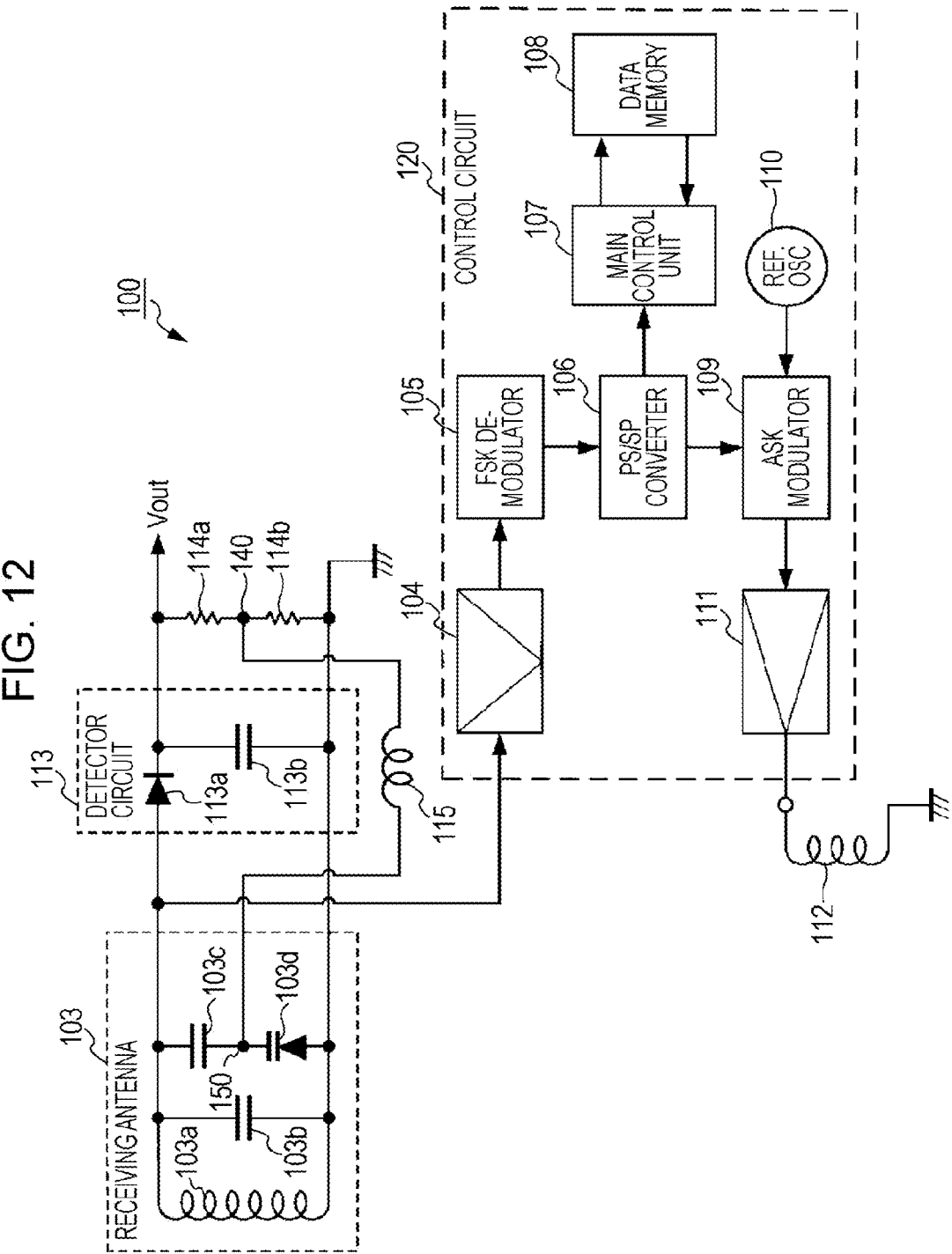
FIG. 12 is a block diagram of a contactless IC card of the related art.
Figure 13:
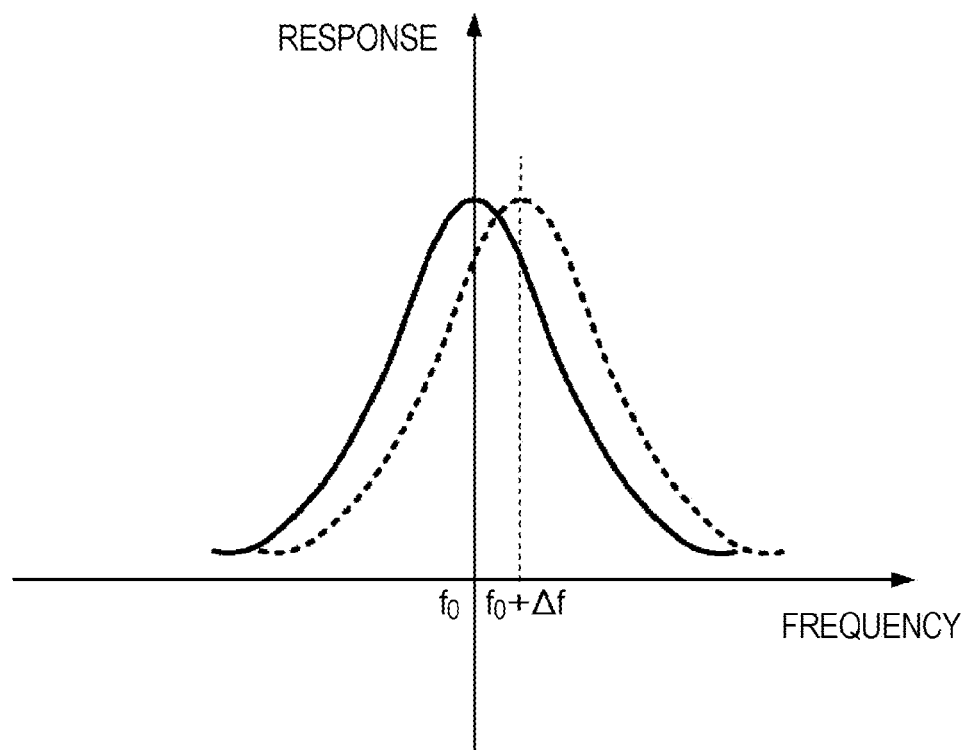
FIG. 13 shows a principle of controlling the voltage level of received signals with a variable capacitance element.
Figure 14A:
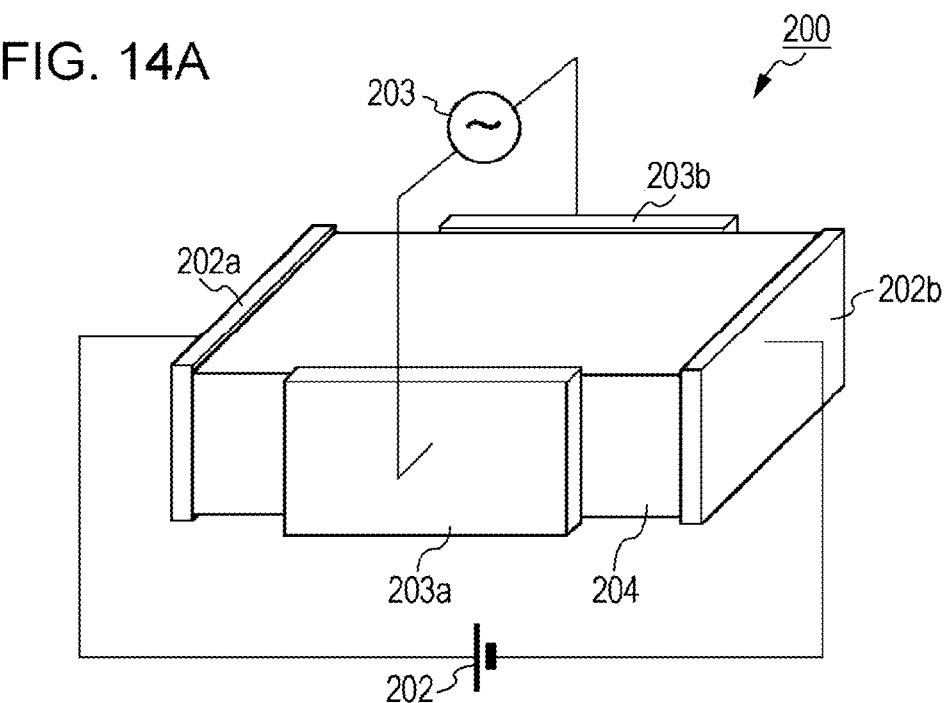
FIG. 14A is a perspective view showing the outline of a variable capacitance element of the related art.
Figure 14B:
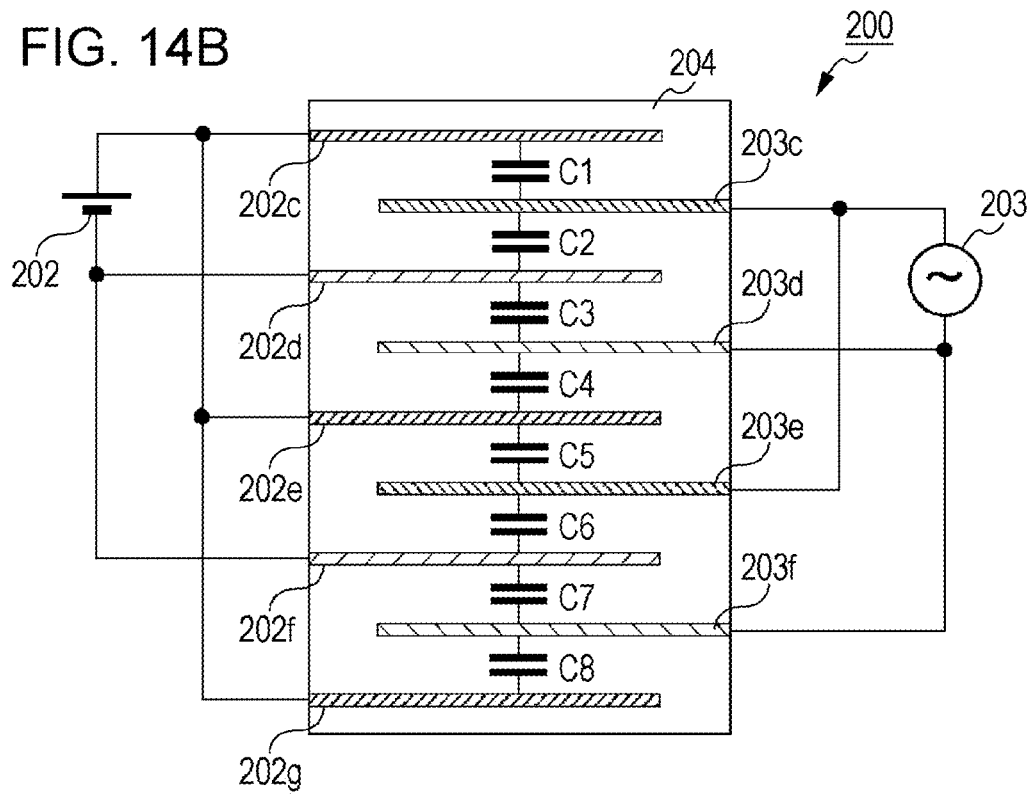
FIG. 14B is a sectional view showing the configuration of a variable capacitance element of the related art.

In the circuit configurations of the example of the related art shown in FIGS. 11A and 12, the variable capacitance element has four terminals; however, the DC bias current flowing from a control voltage source and alternating current signals interfere with each other. In contrast, in this embodiment, the above-described problems can be solved since no control voltage source is used as shown in FIG. 5A.

Moreover, in this embodiment, higher resistance to voltage can also be obtained since the variable capacitor 5b is formed with a ferroelectric material.

In this embodiment, the capacitance lowering region in which the capacitance decreases as the voltage of received signals increases, that is the area equal to or higher than the peak voltage of the capacitance characteristic, is used as an example for the capacitance characteristic of the variable capacitor 5b; however, the present invention is not limited thereto. The variable capacitor 5b may be designed so that the range of voltage change of received signals is equal to or smaller than the peak voltage by suitably adjusting the peak voltage of the capacitance characteristic (by, for example, setting the peak voltage higher). In this case, the capacitance of the variable capacitor 5b monotonically increases as the received voltage increases. As a result, the resonance frequency of the resonant circuit shifts to the lower region of the frequency of the received signals and the voltage at the frequency of the received signals can be controlled.

In this embodiment, at first, the forming conditions and film thickness of the ferroelectric layer 51 are adjusted so that the voltage of received signals corresponding to the maximum capacitance of the variable capacitor 5b (peak voltage) is on the order of the minimum operating voltage of the LSI of the signal processing section 3. Moreover, the forming conditions and film thickness of the ferroelectric layer 51 are adjusted so that the slope of the capacitance lowering region of the capacitance characteristic of the variable capacitor 5b is large.

[4. Specific Example]

Next, a specific example of the embodiment will be described. In the specific example, $BaTiO_3$ (barium titanate) is used as a formation material of the ferroelectric layer 51.

Figure 7:
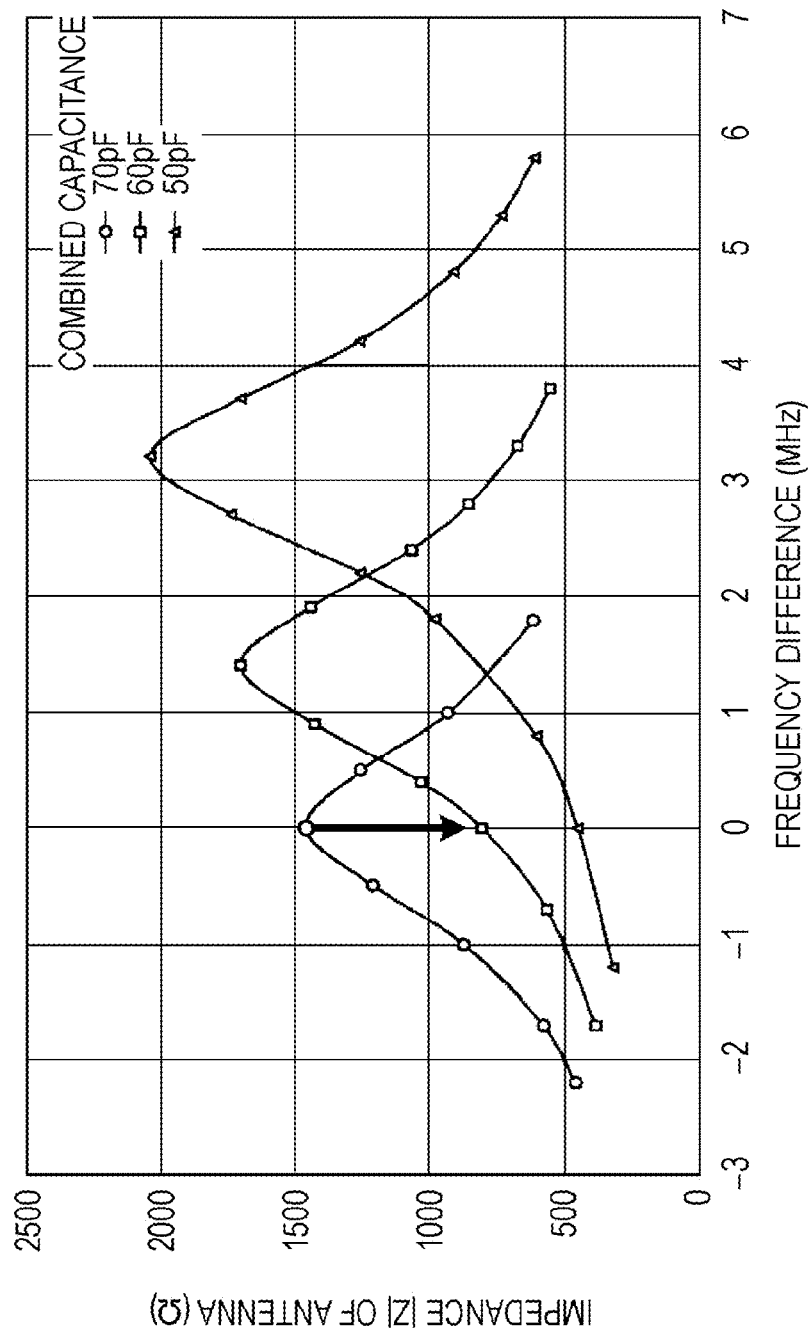
FIG. 7 shows detuning characteristics of a specific example.

FIG. 7 shows frequency characteristics (hereinafter these characteristics are also referred to as detuning characteristics) of the absolute value |Z| of the impedance at the receiving section 1 when the combined capacitance of the receiving section 1 changes. In FIG. 7, the horizontal axis indicates the frequency difference from the resonance frequency (hereinafter referred also to as reference frequency) when the combined capacitance of the receiving section 1 is 70 pF, and the vertical axis indicates the impedance |Z| of the receiving section 1. In this specific example, the resonance frequency (reference frequency) of the receiving section 1 when the combined capacitance of the receiving section 1 is 70 pF is substantially the same as the frequency of received signals.

FIG. 7 shows the characteristics when the combined capacitance C (=Co+Cv) of the resonant capacitor 5 of the receiving section 1 is 70 pF (characteristic indicated by the line with circles), 60 pF (characteristic indicated by the line with squares), or 50 pF (characteristic indicated by the line with triangles). The amount of change of the combined capacitance C is due to the change of the capacitance Cv of the variable capacitor 5b. In the specific example, the capacitance Co of the capacitor 5a is approximately 20 pF to 30 pF. Change width of the capacitance Cv of the variable capacitor 5b is suitably changed according to the capacitance Co of the capacitor 5a.

As is clear from the detuning characteristics of FIG. 7, when the combined capacitance C becomes smaller, that is, when the capacitance Cv of the variable capacitor 5b becomes smaller, the resonance frequency of the receiving section 1 (the frequency when the impedance |Z| is the maximum) shifts to the higher region. As a result, if the combined capacitance C decreases from 70 pF to 60 pF, for example, the impedance |Z| at the reference frequency (the frequency of received signals) decreases to a value of approximately 0.55 times the value before shifting (indicated by the thick arrow in FIG. 7). That is, since the received voltage level of the receiving section 1 is proportional to the impedance |Z|, when the combined capacitance C decreases from 70 pF to 60 pF, the received voltage level of the receiving section 1 is controlled (compressed) to be approximately 0.55 times.

Figure 8:
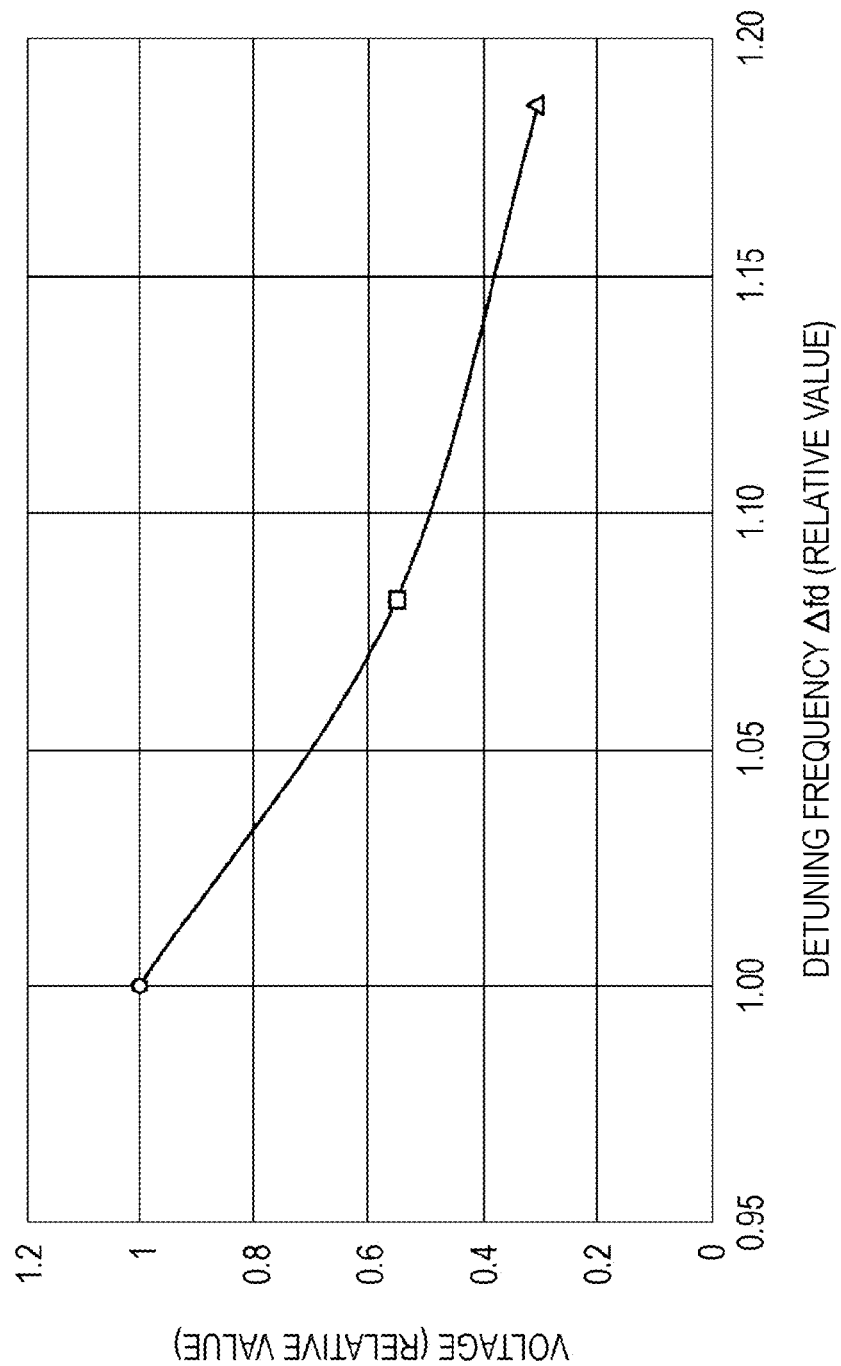
FIG. 8 shows a relationship between the detuning frequency and the voltage compression ratio in the specific example.

FIG. 8 shows a relationship between the relative value (resonance frequency/reference frequency) of the resonance frequency of the receiving section 1 with respect to the reference frequency (frequency of received signal) and the received voltage level (output voltage) of the receiving section 1 at the reference frequency. The relative value of the resonance frequency of the receiving section 1 with respect to the reference frequency (frequency of received signals) is referred to as a detuning value Δfd (or a detuning frequency). The detuning value Δfd is a parameter corresponding to the shift amount of the resonance frequency of the receiving section 1 from the frequency of the received signals.

FIG. 8 corresponds to FIG. 7, and the horizontal axis of FIG. 8 is the detuning value Δfd, and the vertical axis is a relative value (voltage compression ratio) of the received voltage of the receiving section 1 with respect to the reference voltage. The reference voltage of the vertical axis of FIG. 8 is a received voltage (effective value) of the receiving section 1 when the combined capacitance C is 70 pF. The circle in FIG. 8 indicates a data point when the combined capacitance of the receiving section 1 is 70 pF, the square indicates a data point when the combined capacitance is 60 pF, and the triangle indicates a data point when the combined capacitance is 50 pF.

As is clear from FIG. 8, as the detuning value Δfd of the receiving section 1 becomes larger (as the combined capacitance C becomes smaller), the received voltage at the reference frequency at the receiving section 1 becomes smaller. That is, when the detuning value Δfd of the receiving section 1 becomes larger, the voltage compression ratio becomes smaller (the degree of compression of voltage becomes larger).

Figure 9:
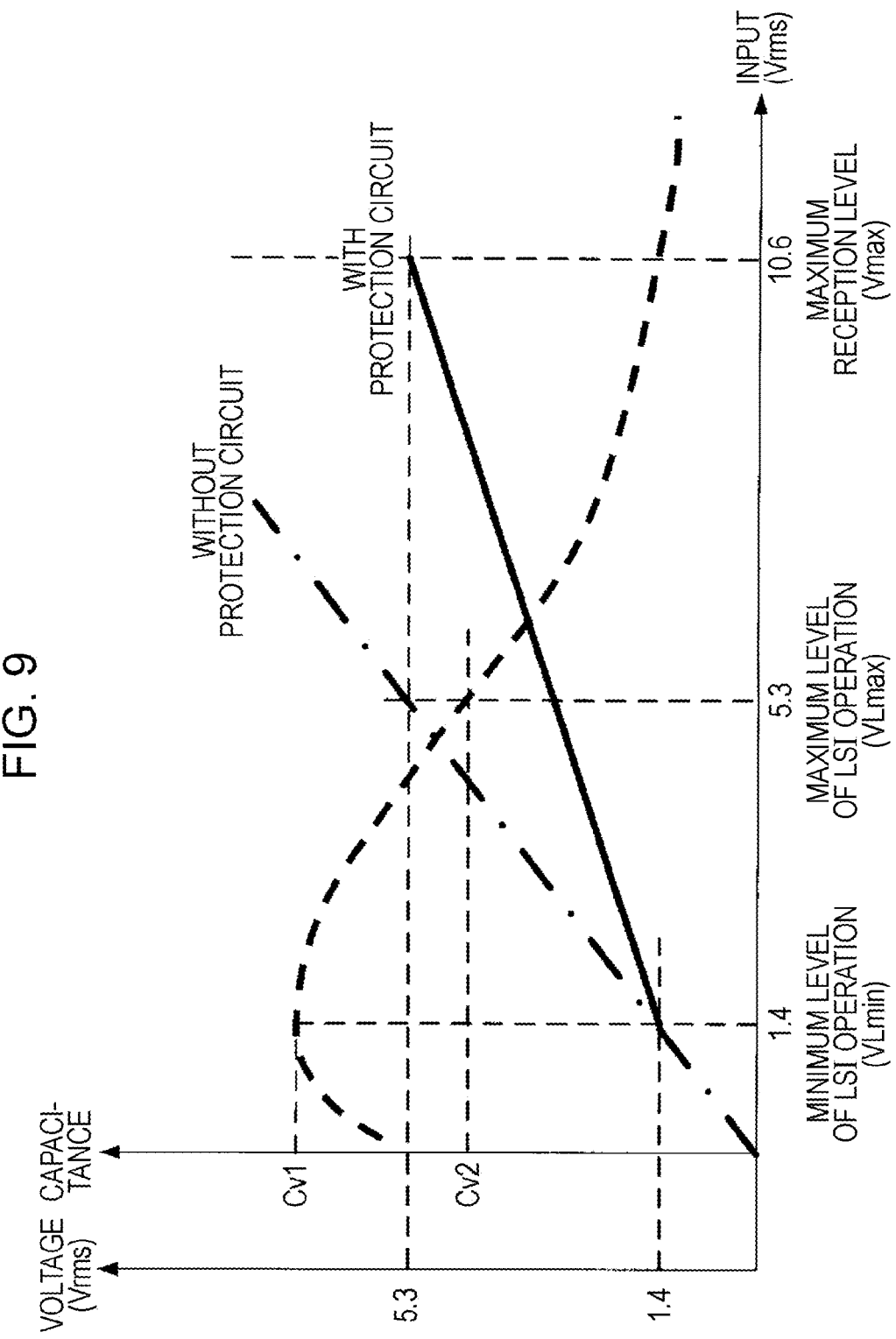
FIG. 9 is a graph to explain a design summary of the variable capacitor in the specific example.

A design example of the variable capacitor 5b described in the specific example will be described using the characteristic shown in FIG. 8 and the characteristic shown in FIG. 9 described above. FIG. 9 shows compression characteristics of the voltage of received signals at the receiving section 1. In FIG. 9, the horizontal axis indicates the voltage (effective value) of received signals, and the vertical axis indicates received voltages (effective value) at the receiving section 1 at the frequency of received signals.

In FIG. 9, the alternate long and short dash line indicates a characteristic when a protection circuit is not provided, and the solid line indicates a characteristic of the specific example (when provided with a protection circuit). FIG. 9 also shows the capacitance characteristic (indicated by the dashed line) of the variable capacitor 5b. In the specific example, the maximum voltage Vmax of received signals is 10.6 (Vrms), and the acceptable voltage range (VLmin to VLmax) where the LSI of the signal processing section 3 operates and is not destroyed is 1.4 to 5.3 (Vrms)

In the specific example, the peak voltage corresponding to the maximum capacitance (Cv1 in FIG. 9) of the variable capacitor 5b is designed to be on the order of the minimum operating voltage (VLmin=1.4 Vrms) of the signal processing section 3. Therefore, in the range in which the voltage of received signals changes (VLmin to Vmax), the capacitance characteristic in which the capacitance Cv (combined capacitance C of the resonant capacitor 5) of the variable capacitor 5b decreases as the voltage increases is obtained (the characteristic is indicated by the dashed line in FIG. 9).

In addition, in the specific example, the capacitance characteristic of the variable capacitor 5b is designed so that the received voltage level at the receiving section 1 is on the order of the maximum operating voltage VLmax of the signal processing section 3 when received signals with the maximum voltage Vmax are input to the receiving section 1. The Specific Design is as Follows.

It is necessary for the voltage compression ratio at the receiving section 1 to be approximately 0.5 to lower the maximum voltage Vmax (=10.6 Vrms) to the maximum voltage VLmax (=5.3 Vrms) of operation of the LSI when received signals with the voltage are input to the receiving section 1. To obtain the voltage compression ratio, the detuning value Δfd at the receiving section 1 has to be approximately 1.10 from FIG. 8.

Here, the combined capacitance C of the resonant capacitor 5 when the detuning value Δfd is 1 (when the resonance frequency of the receiving section 1 is the same as the frequency of received signals) is $C_1$, and the combined capacitance C of the resonant capacitor 5 when the detuning value Δfd is approximately 1.10 is $C_2$. Since the resonance frequency at the receiving section 1 is proportional to $1/C^{1/2}$, the relationship of $C_2=C_1/1.10^2$ is obtained between $C_1$ and $C_2$. Therefore, if the capacitance characteristic of the variable capacitor 5b is designed to satisfy this relational expression, when received signals with the maximum voltage (10.6 Vrms) are input to the receiving section 1, the maximum voltage can be compressed to the maximum voltage (5.3 Vrms) of operation of the LSI at the receiving section 1.

With the design as described above, as shown by the solid line in FIG. 9, when received signals with the minimum operating voltage VLmin of the LSI (=1.4 Vrms) are input, the received voltage (output voltage) of the receiving section 1 is 1.4 Vrms, and the voltage compression ratio is 1. On the other hand, when received signals with the maximum voltage Vmax (=10.6 Vrms) are input to the receiving section 1, the voltage is compressed to ½ at the receiving section 1, and the received voltage of the receiving section 1 is 5.3 Vrms, which is the same as the maximum voltage VLmax of operation of the LSI.

When the resonant capacitor 5 is designed to satisfy the relationship of $C_2<C_1/1.10^2$, the voltage of the alternating current signal output from the receiving section 1 when received signals with the maximum voltage Vmax are input to the receiving section 1 is smaller than the maximum voltage VLmax of operation of the LSI. That is, in the specific example, the voltage of the alternating current signal output from the receiving section 1 falls within the tolerance of operation of the LSI of the signal processing section 3 by designing the resonant capacitor 5 to satisfy the relationship of $C_2 \leq C_1/1.10^2$; therefore, the LSI will not be destroyed.

The above-mentioned relational expression of the combined capacitance of the resonant capacitor 5 is generalized to be $C_2 \leq C_1/\Delta fd^2$. Where the detuning value Δ Fd is a detuning value at the receiving section 1 (resonant circuit) corresponding to the relative value (VLmax/Vmax: the minimum necessary voltage compression ratio) of the maximum operating voltage VLmax of the signal processing section 3 with respect to the maximum voltage Vmax of received signals.

When actually designing a resonant capacitor 5 at the receiving section 1, it is desirable to take into consideration influences of the capacitor 5a whose capacitance does not change with respect to the voltage, the capacitance of the resonance coil 4, and variation in the parasitic capacitance of the input terminal of the LSI, etc. Therefore, with these influences taken into consideration, the capacitance characteristic is preferably set so that the capacitance Cv1 of the variable capacitor 5b when signals of the minimum voltage VLmin of operation of the LSI are received is more than approximately four times the capacitance Cv2 when signals of the maximum voltage Vmax are received.

In the above-mentioned specific example, when setting the capacitance characteristic of the variable capacitor 5b, the effective value is used as a voltage of received signals corresponding to the capacitance as an example; however, the present invention is not limited thereto. Instead, the maximum value of the voltage of received signals or the average value per half cycle of received signals may be used, for example.

[5. Modified Example]

In the above-mentioned embodiment, the receiving section 1 (antenna) including the resonant capacitor 5 provided with the capacitor 5a whose capacitance remains almost the same with respect to the voltage and the variable capacitor 5b connected in parallel is used as an example; however, the present invention is not limited thereto. The resonant capacitor 5 may include only the variable capacitors 5b, or the resonant capacitor 5 may include the capacitor 5a and the variable capacitor 5b connected in series, for example.

Figure 10A:
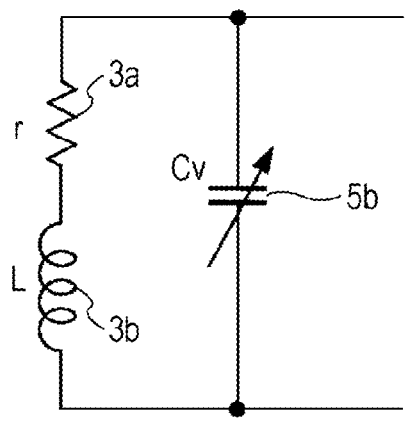
FIG. 10A is a schematic circuit diagram of the receiving section of the modified example 1.
Figure 10B:
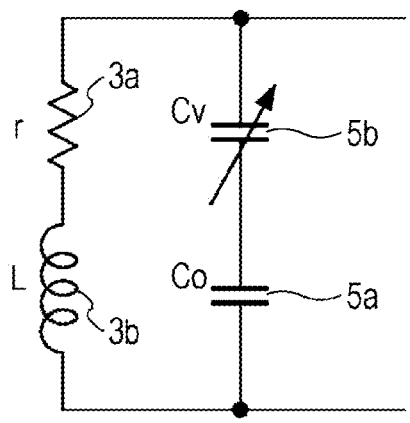
FIG. 10B is a schematic circuit diagram of the receiving section of the modified example 2.

FIG. 10A shows a structure of the receiving section 1 in the case that the resonant capacitor 5 only includes the variable capacitor 5b (modified example 1). In addition, FIG. 10B shows a structure of the receiving section 1 in the case that the resonant capacitor 5 is provided with the capacitor 5a and the variable capacitor 5b connected in series (modified example 2). In each case, the same effect as the above-described embodiment is obtained by adjusting the combined capacitance C (C=Cv in the modified example 1) of the resonant capacitor 5 of the receiving section 1 in the same manner as the design summary described in the above-mentioned embodiment.

In the above-mentioned embodiment, contactless IC cards are used as an example of a contactless receiver for description; however, the present invention is not limited thereto. The present invention can be applied to any device which receives information and/or electric power in a non-contact manner using a resonant circuit including a resonance coil and a resonant capacitor, and the same effect is obtained with such a device. The present invention can also be applied, for example, to mobile phones and wireless power transmission devices, etc. Since wireless power transmission devices are designed to transmit electric power in a non-contact manner, the devices typically do not have to include a signal processing section to demodulate received signals unlike contactless IC cards.

The present application contains subject matter related to that disclosed in Japanese Priority Patent Application JP 2008-222812 filed in the Japan Patent Office on Aug. 29, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A contactless receiver comprising:
a receiving section having a resonant circuit to receive an input signal at a predetermined frequency, the resonant circuit including:
a resonant capacitor comprising a variable capacitor comprising i) a ferroelectric layer and ii) electrodes arranged so as to apply an alternating current voltage of the input signal at the predetermined frequency to the ferroelectric layer to change a capacitance of the ferroelectric layer; and
a resonance coil connected to the resonant capacitor; and
a rectification section operable to convert the alternating current voltage output from the receiving section into a direct current voltage,
wherein the ferroelectric layer of the variable capacitor has characteristics that the capacitance thereof increases according to the alternating current voltage of the input signal at the predetermined frequency applied thereto, in a first voltage range where the alternating current voltage of the input signal at the predetermined frequency applied thereto is smaller than a voltage corresponding to a maximum capacitance of the ferroelectric layer, and decreases according to the alternating current voltage of the input signal at the predetermined frequency applied thereto, in a second voltage range where the alternating current voltage of the input signal at the predetermined frequency applied thereto is larger than the voltage corresponding to the maximum capacitance of the ferroelectric layer.

2. The contactless receiver according to claim 1, further comprising:
a signal processing section operable to demodulate received signals, the signal processing section operating with the direct current voltage output from the rectification section.

3. The contactless receiver according to claim 2, wherein the alternating current voltage of the input signal at the predetermined frequency applied to the electrodes of the variable capacitor corresponding to a maximum capacitance of the variable capacitor is equal to or smaller than a minimum operating voltage of the signal processing section.

4. The contactless receiver according to claim 2, wherein a relationship of $C_2 \leq C_1/(\Delta fd)^2$ is satisfied, where the capacitance of the resonant capacitor is $C_1$ when a resonance frequency of the resonant circuit is substantially the same as the predetermined frequency, the capacitance of the resonant capacitor when the received alternating current voltage is largest is $C_2$, and a detuning value of the resonant circuit corresponding to a relative value of a largest operating voltage of the signal processing section with respect to the largest received alternating current voltage is $\Delta fd$.

5. The contactless receiver according to claim 1, wherein the resonant capacitor comprised of the variable capacitor only.

6. The contactless receiver according to claim 1, wherein the first voltage range and the second voltage range are within a predetermined voltage range of the alternating current voltage of the input signal at the predetermined frequency applied to the ferroelectric layer of the variable capacitor.

7. The contactless receiver according to claim 1, wherein the ferroelectric layer of the variable capacitor formed of an aggregate of particles, each particle including a core portion composed of a ferroelectric material and a shell portion composed of a paraelectric material, the shell portion surrounding the core portion.

8. The contactless receiver according to claim 7, wherein the ferroelectric material is a ferroelectric material in which ionic polarization occurs.

9. A resonant circuit comprising:
a resonant capacitor comprising a variable capacitor comprising i) a ferroelectric layer and ii) electrodes arranged so as to apply an alternating current voltage of the input signal at the predetermined frequency to the ferroelectric layer to change a capacitance of the ferroelectric layer; and a resonance coil connected to the resonant capacitor, wherein the ferroelectric layer of the variable capacitor has characteristics that the capacitance thereof increases according to the alternating current voltage of the input signal at the predetermined frequency applied thereto, in a first voltage range where the alternating current voltage of the input signal at the predetermined frequency applied thereto is smaller than a voltage corresponding to a maximum capacitance of the ferroelectric layer, and decreases according to the alternating current voltage of the input signal at the predetermined frequency applied thereto, in a second voltage range where the alternating current voltage of the input signal at the predetermined frequency applied thereto is larger than the voltage corresponding to the maximum capacitance of the ferroelectric layer.

10. The resonant circuit according to claim 9, wherein the first voltage range and the second voltage range are within a predetermined voltage range of the alternating current voltage of the input signal at the predetermined frequency applied to the ferroelectric layer.

11. The resonant circuit according to claim 9, wherein the ferroelectric layer of the variable capacitor formed of an aggregate of particles, each particle including a core portion composed of a ferroelectric material and a shell portion composed of a paraelectric material, the shell portion surrounding the core portion.

12. The resonant circuit according to claim 11, wherein the ferroelectric material is a ferroelectric material in which ionic polarization occurs.

13. A variable capacitor comprising:
a ferroelectric layer; and
electrodes arranged so as to apply an alternating current voltage of an input signal at a predetermined frequency to the ferroelectric layer to change a capacitance of the ferroelectric layer, wherein the ferroelectric layer has characteristics that the capacitance thereof increases according to the alternating current voltage of the input signal at the predetermined frequency applied thereto in a first voltage range where the alternating current voltage of the input signal at the predetermined frequency applied thereto is smaller than a voltage corresponding to a maximum capacitance of the ferroelectric layer and decreases according to the alternating current voltage of the input signal at the predetermined frequency applied thereto in a second voltage range where the alternating current voltage of the input signal at the predetermined frequency applied thereto is larger than the voltage corresponding to the maximum capacitance of the ferroelectric layer.

14. The variable capacitor according to claim 13, wherein the first voltage range and the second voltage range are within a predetermined voltage range of the alternating current voltage of the input signal at the predetermined frequency applied to the ferroelectric layer.

15. The variable capacitor according to claim 13, wherein the ferroelectric layer formed of an aggregate of particles, each particle including a core portion composed of a ferroelectric material and a shell portion composed of a paraelectric material, the shell portion surrounding the core portion.

16. The variable capacitor according to claim 15, wherein the ferroelectric material is a ferroelectric material in which ionic polarization occurs.

* * * * *